(12) United States Patent
Senf, Jr.

(10) Patent No.: US 11,912,104 B2
(45) Date of Patent: Feb. 27, 2024

(54) METHOD OF DEFROSTING A REFRIGERATION SYSTEM

(71) Applicant: Carrier Corporation, Palm Beach Gardens, FL (US)

(72) Inventor: Raymond L. Senf, Jr., Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/045,948

(22) PCT Filed: Feb. 26, 2019

(86) PCT No.: PCT/US2019/019517
§ 371 (c)(1),
(2) Date: Oct. 7, 2020

(87) PCT Pub. No.: WO2019/199386
PCT Pub. Date: Oct. 17, 2019

(65) Prior Publication Data
US 2021/0146751 A1 May 20, 2021

Related U.S. Application Data

(60) Provisional application No. 62/657,206, filed on Apr. 13, 2018.

(51) Int. Cl.
*B60H 1/32* (2006.01)
*F25D 21/08* (2006.01)
(Continued)

(52) U.S. Cl.
CPC ......... *B60H 1/00785* (2013.01); *B60H 1/321* (2013.01); *F25D 11/003* (2013.01);
(Continued)

(58) Field of Classification Search
CPC ... B60H 1/00785; B60H 1/321; F25D 11/003; F25D 21/002; F25D 21/08; F25D 2700/02
See application file for complete search history.

(56) References Cited

U.S. PATENT DOCUMENTS 2,986,014 A 5/1961 Schilling
4,297,852 A 11/1981 Brooks
(Continued)

FOREIGN PATENT DOCUMENTS

JP 2004085109 3/2004
JP 2018009709 A * 1/2018

OTHER PUBLICATIONS

International Preliminary Report on Patentability for International Application No. PCT/US2019/019517 dated Oct. 22, 2020.
(Continued)

*Primary Examiner* — Nelson J Nieves
(74) *Attorney, Agent, or Firm* — Carlson, Gaskey & Olds, P.C.

(57) ABSTRACT

A method of operating a refrigeration system (20) includes operating the refrigeration system in refrigeration mode. A current access condition into a refrigerated cargo space (22) is detected. At least one heat exchanger (32) in the refrigerated cargo space (22) is directed into a defrost mode during the current access condition. The refrigeration system (20) is directed into a refrigeration mode when the current access condition is no longer detected.

20 Claims, 2 Drawing Sheets

(51) Int. Cl.
*B60H 1/00* (2006.01)
*F25D 11/00* (2006.01)
*F25D 21/00* (2006.01)

(52) U.S. Cl.
CPC ........... *F25D 21/002* (2013.01); *F25D 21/08* (2013.01); *F25D 2700/02* (2013.01)

(56) References Cited

U.S. PATENT DOCUMENTS

| | | | |
|---|---|---|---|
| 5,228,300 A | 7/1993 | Shim | |
| 5,231,844 A | 8/1993 | Park | |
| 6,205,800 B1* | 3/2001 | Topper | A47F 3/0404 |
| | | | 62/156 |
| 6,427,772 B1* | 8/2002 | Oden | F25D 21/006 |
| | | | 165/11.1 |
| 6,772,597 B1* | 8/2004 | Zentner | F25D 21/006 |
| | | | 62/153 |
| 8,136,363 B2* | 3/2012 | Ludwig | B60H 1/00014 |
| | | | 62/151 |
| 9,712,893 B2 | 7/2017 | Warkentin | |
| 2001/0054292 A1* | 12/2001 | Davis | F25D 21/006 |
| | | | 62/154 |
| 2002/0139132 A1 | 10/2002 | Collins | |
| 2002/0184900 A1* | 12/2002 | Wellman | A47F 3/0469 |
| | | | 62/155 |
| 2003/0131615 A1* | 7/2003 | Collins | F25D 21/006 |
| | | | 62/156 |
| 2005/0066667 A1* | 3/2005 | Strauss | F25D 21/008 |
| | | | 62/80 |
| 2006/0248904 A1 | 11/2006 | Ludwig | |
| 2007/0283706 A1* | 12/2007 | Kang | F25D 21/12 |
| | | | 62/156 |
| 2010/0107661 A1 | 5/2010 | Awwad | |
| 2011/0289945 A1* | 12/2011 | Choi | F25D 29/00 |
| | | | 62/80 |
| 2012/0204581 A1* | 8/2012 | Kang | F25D 17/042 |
| | | | 62/78 |
| 2013/0086929 A1 | 4/2013 | Senf, Jr. | |
| 2016/0101674 A1 | 4/2016 | Riviere et al. | |
| 2021/0055035 A1* | 2/2021 | Teng | F25D 21/02 |

OTHER PUBLICATIONS

International Search Report and Written Opinion for International Application No. PCT/US2019/019517 dated May 16, 2019.

* cited by examiner

METHOD OF DEFROSTING A REFRIGERATION SYSTEM

CROSS-REFERENCE TO RELATED APPLICATIONS

This application claims priority to U.S. Provisional Application No. 62/657,206, which was filed on Apr. 13, 2018 and is incorporated herein by reference.

BACKGROUND

Typically, refrigeration systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space. During operation, the cargo space may be accessed frequently, which leads to temperature and moisture variations in the cargo space.

SUMMARY

In one exemplary embodiment, a method of operating a refrigeration system includes operating the refrigeration system in refrigeration mode. A current access condition into a refrigerated cargo space is detected. At least one heat exchanger in the refrigerated cargo space is directed into a defrost mode during the current access condition. The refrigeration system is directed into a refrigeration mode when the current access condition is no longer detected.

In a further embodiment of any of the above, the defrost mode includes heating the at least one heat exchanger.

In a further embodiment of any of the above, at least one heat exchanger is heated with a resistive heating element.

In a further embodiment of any of the above, the current access condition includes at least one of a door or a hatch into the refrigerated cargo space in an open position.

In a further embodiment of any of the above, detecting the current access condition includes sensing the opening of an access point with an access point sensor.

In a further embodiment of any of the above, the method includes detecting a current access condition into the refrigerated cargo space. A length of time between a preceding defrost mode and the detection of the current access condition is determined. A defrost mode is entered if the length of time is greater than a predetermined amount of time.

In a further embodiment of any of the above, the method includes determining a length of time between the preceding defrost mode. The detection of the current access action includes measuring the length of time from a beginning of the preceding defrost mode.

In a further embodiment of any of the above, the method includes detecting a current access condition into the first refrigeration compartment. A length of time between a completion of a preceding defrost mode and the detection of the current access condition is determined. It will remain in the refrigeration mode if the length of time is less than a predetermined amount of time.

In a further embodiment of any of the above, the refrigeration system is a transport refrigeration system.

In a further embodiment of any of the above, the method includes directing the refrigeration system into a refrigeration mode when a length of time of the defrost mode exceeds a predetermined defrost length of time.

In another exemplary embodiment, a controller for a refrigeration system includes a processor and memory comprising computer-executable instructions that, when executed by the processor, cause the processor to perform operations. The operations includes operating the refrigeration system in refrigeration mode. A current access condition into a refrigerated cargo space is detected. At least one heat exchanger in the refrigerated cargo space is directed into a defrost mode during the current access condition. The refrigeration system is directed into a refrigeration mode when the current access condition is no longer detected.

In a further embodiment of any of the above, the defrost mode includes heating the at least one heat exchanger.

In a further embodiment of any of the above, at least one heat exchanger is heated with a resistive heating element.

In a further embodiment of any of the above, the current access condition includes at least one of a door or a hatch into the refrigerated cargo space in an open position.

In a further embodiment of any of the above, detection of the current access condition includes sensing the opening of an access point with an access point sensor.

In a further embodiment of any of the above, the operations further include detecting a current access condition into the refrigerated cargo space. A length of time between a preceding defrost mode and the detection of the current access condition is determined. A defrost mode is entered if the length of time is greater than a predetermined amount of time.

In a further embodiment of any of the above, determining a length of time between the preceding access condition and the detection of the current access action includes measuring the length of time from a beginning of the preceding defrost mode.

In a further embodiment of any of the above, the operations further include detecting a current access condition into the first refrigeration compartment. A length of time between a completion of a preceding defrost mode and the detection of the current access condition is determined. remaining in the refrigeration mode if the length of time is less than a predetermined amount of time.

In a further embodiment of any of the above, the refrigeration system is a transport refrigeration system.

In a further embodiment of any of the above, the operations further includes directing the refrigeration system into a refrigeration mode when a length of time of the defrost mode exceeds a predetermined defrost length of time.

DETAILED DESCRIPTION

Figure 1:
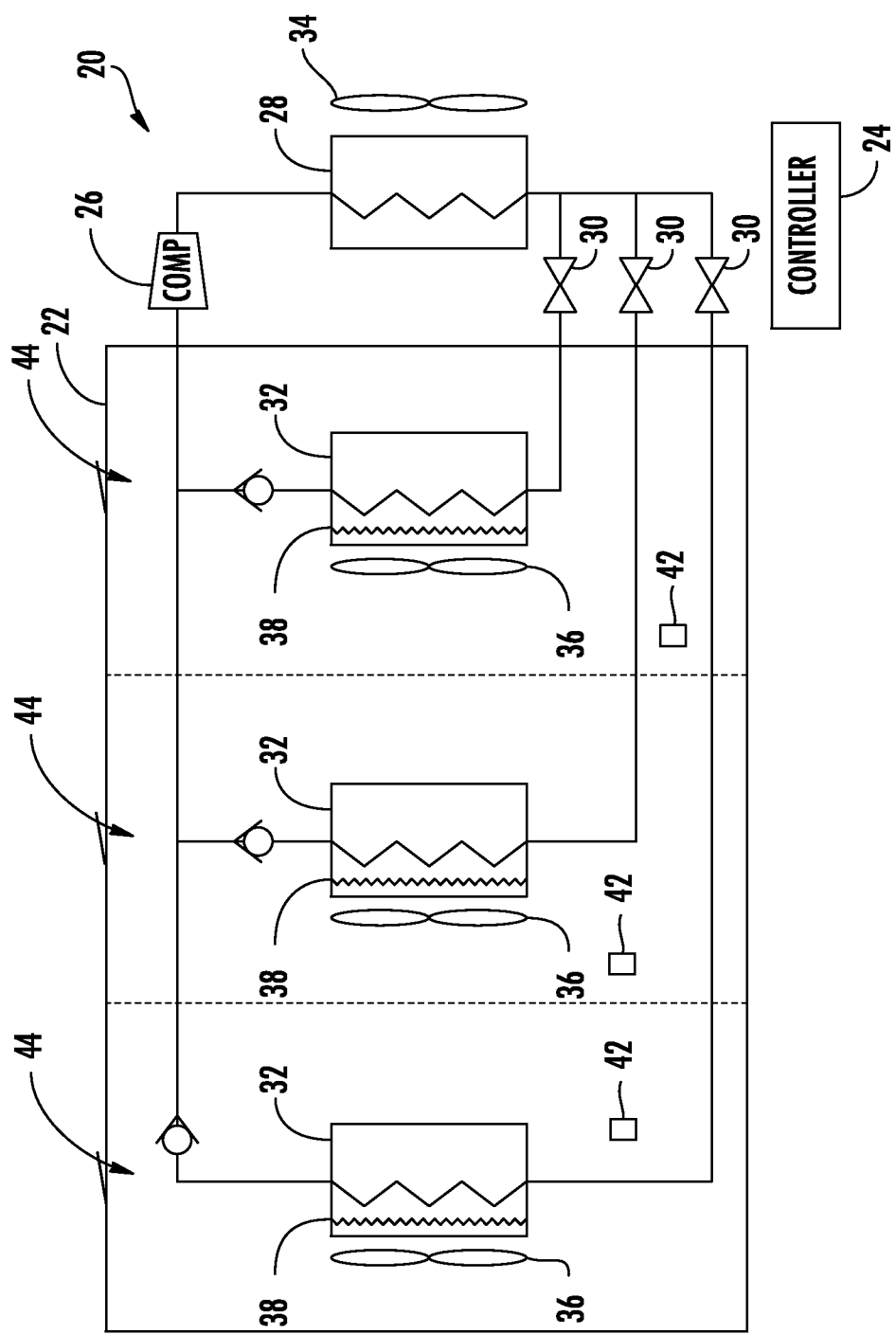
FIG. 1 is a schematic view illustrating a transport refrigeration system.

FIG. 1 illustrates a transport refrigeration system 20 associated with a cargo space 22, such as a refrigerated cargo space. A controller 24 manages operation of the refrigeration system 20 to establish and regulate a desired product storage temperature within the cargo space 22. The cargo space 22 may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The refrigeration system 20 includes a refrigerant compression device 26, a refrigerant heat rejection heat exchanger 28, an expansion device 30, such as an electronically controlled expansion valve, and a refrigerant heat absorption heat exchanger 32 connected in a closed loop refrigerant circuit and arranged in a conventional refrigeration cycle. The refrigeration system 20 also includes one or more fans 34 associated with the heat rejection heat exchanger 28 and one or more fans 36 associated with the heat absorption heat exchanger 32. The refrigeration system 20 may also include an electric resistance heater 38 associated with the heat absorption heat exchanger 32. It is to be understood that other components (not shown) may be incorporated into the refrigerant circuit as desired, including for example, but not limited to, a suction modulation valve, a receiver, a filter/dryer, an economizer circuit.

The heat rejection heat exchanger 28 may, for example, comprise one or more refrigerant conveying coiled tubes or one or more tube banks formed of a plurality of refrigerant conveying tubes extending between respective inlet and outlet manifolds. The fan(s) 34 are operative to pass air, typically ambient air, across the tubes of the refrigerant heat rejection heat exchanger 28 to cool refrigerant vapor passing through the tubes.

The heat absorption heat exchanger 32 may, for example, also comprise one or more refrigerant conveying coiled tubes or one or more tube banks formed of a plurality of refrigerant conveying tubes extending between respective inlet and outlet manifolds. The fan(s) 36 are operative to pass air drawn from the temperature controlled cargo space 22 across the tubes of the heat absorption heat exchanger 32 to heat the refrigerant passing through the tubes and cool the air. The air cooled in traversing the heat absorption heat exchanger 32 is supplied back to the temperature controlled cargo space 22.

The refrigerant compression device 26 may comprise a single-stage or multiple-stage compressor such as, for example, a reciprocating compressor or a scroll compressor.

In the refrigeration system 20, the controller 24 is configured for controlling operation of the refrigeration system 20 including, but not limited to, operation of the various components of the refrigerant system 20 to provide and maintain a desired operating temperature within the cargo space 22. The controller 24 may be an electronic controller including a microprocessor and an associated memory bank. The controller 24 controls operation of various components of the refrigeration system 20, such as the refrigerant compression device 26, the expansion device 30, the fans 34, 36, and the electric resistance heater 38. The controller 24 is also in electrical communication with plurality of access point sensors 42 associated with access points 44, such as doors or hatches, into the cargo space 22. At least one of the plurality of access point sensors 42 is associated with each of the access points 44 to determine when an access condition occurs such as opening one of the access points 44. When one of the access points 44 are opened, it is possible for unconditioned air to enter the cargo space 22 such that variations in temperature and humidity occur within the cargo space 22.

During operation of the refrigeration system 20, the access points 44 are opened and closed for extending periods of time to allow for cargo to be loaded and unloaded from the cargo space 22. During the periods of time when the access points 44 are in an open position, unconditioned air enters the cargo space 22. The unconditioned air can increase an amount of moisture in the cargo space 22. The increased amount of moisture in the cargo space can lead to decreased performance of the heat absorption heat exchanger 32, because the moisture can accumulate on the heat absorption heat exchanger 32 in the form of ice. Ice on the heat absorption heat exchanger 32 reduces the ability of the refrigerant to absorb heat from the air in the cargo space 22. Advantageously, controlling the amount of ice formation on the heat absorption heat exchanger 32 will improve the ability of the refrigeration system 20 to maintain the desired temperature of the cargo space 22.

Figure 2:
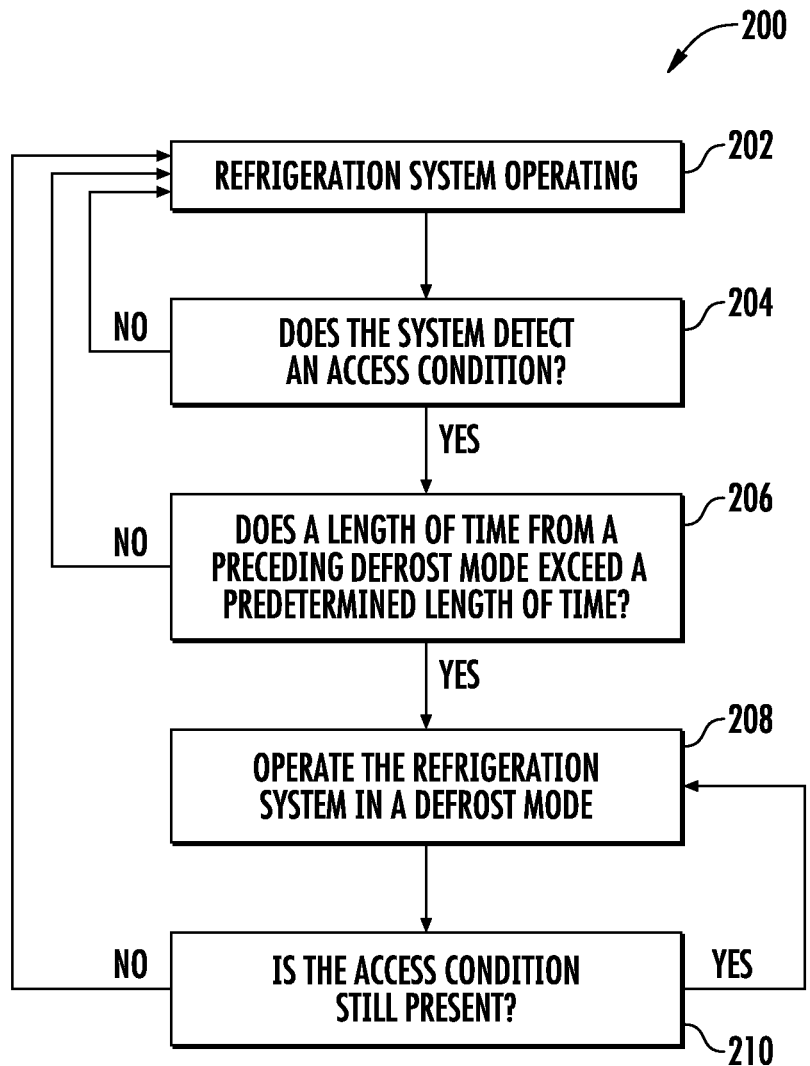
FIG. 2 is a flow diagram illustrating a method of operating the transport refrigeration system.

FIG. 2 illustrates a flow diagram 200 of a method of operating the refrigeration system 20. The method begins at block 202 with the refrigeration system 20 operating in a refrigeration mode under the control of the controller 24. The refrigeration mode extracts heat from the cargo space 22 and transfers it into the refrigerant through the heat absorption heat exchanger 32.

As indicated by block 204, while the refrigeration system 10 is in operation, the controller 24 monitors the access points 44 with at least one corresponding access point sensor 42. The controller 24 detects one of the access points in an open position when the controller 24 receives a signal from one of the access point sensors 42 indicating that at least one of the access points 44 is in an open position.

As indicated in block 206, when the controller 24 has detected an access condition, the controller 24 determines a length of time between the current access condition and a preceding defrost mode. In one example, the length of time is measured from the beginning of the preceding defrost mode. If the preceding defrost mode occurred less than a predetermined length of time before the current access condition, the refrigeration system 20 will remain in the refrigeration mode to prevent the cargo space 22 from varying from the desired operating temperature for an extended period of time.

If the preceding defrost mode occurred more than the predetermined length of time before the current access condition as determined by the controller, the controller 24 will direct the refrigeration system 20 into a defrost mode as indicated at block 208. In the defrost mode, the controller 24 will disable or reduce the heat rejection function of the heat absorption heat exchanger 32 and operate the fan 36 to direct air over the refrigerant heat absorption heat exchanger 32. Moreover, the controller 24 can engage the electric resistance heater 38 with or without the fan 36 to defrost the heat absorption heat exchanger 32. By placing the heat absorption heat exchanger 32 in the defrost mode instead of a reduced or suspended capacity, the heat absorption heat exchanger 32 will have the greatest amount of cooling capacity and moisture management available to recover from the access condition into the cargo space 22.

As indicated at block 210, the controller 24 continued to monitor whether the access condition is present and directs the refrigeration system 20 to remain in the defrost mode while the access condition is present. However, once the controller 24 determines that the access condition is no longer present, the controller 24 will direct the refrigeration system 20 into the refrigeration mode of block 202 and continue to monitor for the occurrence of another access condition as outlined above and in FIG. 2. Moreover, if the controller 24 determines that the length of time that the refrigeration system 20 has been in a defrost mode exceeds a predetermined defrost length of time, the controller 24 can direct the refrigeration system into the refrigeration mode even though the access condition is present.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of operating a refrigeration system, the method comprising:
    operating the refrigeration system in refrigeration mode;
    detecting a current access condition into a refrigerated cargo space;
    in response to a detection of the current access condition, determining a length of time between a preceding defrost mode and the detection of the current access condition;
    directing at least one heat exchanger in the refrigerated cargo space into a defrost mode during the current access condition if the length of time is greater than a predetermined amount of time; and
    directing the refrigeration system into the refrigeration mode when the current access condition is no longer detected.

2. The method of claim 1, wherein the defrost mode includes heating the at least one heat exchanger.

3. The method of claim 2, wherein the at least one heat exchanger is heated with a resistive heater.

4. The method of claim 1, wherein the current access condition includes at least one of a door or a hatch into the refrigerated cargo space in an open position.

5. The method of claim 4, wherein detecting the current access condition includes sensing an opening of at least one of the door or the hatch with an access point sensor.

6. The method of claim 1, wherein determining the length of time between the preceding defrost mode and the detection of the current access condition includes measuring the length of time from a beginning of the preceding defrost mode.

7. The method of claim 4, further comprising:
    determining a length of time between a completion of a preceding defrost mode and the detection of the current access condition; and
    remaining in the refrigeration mode if the length of time is less than a predetermined amount of time.

8. The method of claim 6, wherein the refrigeration system is a transport refrigeration system.

9. The method of claim 6, further comprising:
    directing the refrigeration system into a refrigeration mode when a length of time of the defrost mode exceeds a predetermined defrost length of time.

10. The method of claim 1, further comprising:
    determining a length of time that the refrigeration system has been in the defrost mode during the detection of the current access condition; and
    directing the refrigeration system into the refrigeration mode if the length of time that the refrigeration system has been in the defrost mode during the detection of the current access condition exceeds a predetermined defrost length of time even though the current access condition is still present.

11. A controller for a refrigeration system comprising:
    a processor; and
    a memory comprising computer-executable instructions that, when executed by the processor, cause the processor to perform operations, the operations comprising:
        operating the refrigeration system in refrigeration mode;
        detecting a current access condition into a refrigerated cargo space;
        in response to a detection of the current access condition, determining a length of time between a preceding defrost mode and the detection of the current access condition;
        directing at least one heat exchanger in the refrigerated cargo space into a defrost mode during the current access condition if the length of time is greater than a predetermined amount of time; and
        directing the refrigeration system into the refrigeration mode when the current access condition is no longer detected.

12. The controller of claim 11, wherein the defrost mode includes heating the at least one heat exchanger.

13. The controller of claim 12, wherein the at least one heat exchanger is heated with a resistive heater.

14. The controller of claim 11, wherein the current access condition includes at least one of a door or a hatch into the refrigerated cargo space in an open position.

15. The controller of claim 14, wherein detecting the current access condition includes sensing an opening of the at least one of the door or the hatch with an access point sensor.

16. The controller of claim 11, wherein determining a length of time between the preceding defrost mode and the detection of the current access condition includes measuring the length of time from a beginning of the preceding defrost mode.

17. The controller of claim 15, wherein the operations further comprise:
    determining a length of time between a completion of a preceding defrost mode and the detection of the current access condition; and
    remaining in the refrigeration mode if the length of time is less than a predetermined amount of time.

18. The controller of claim 16, wherein the refrigeration system is a transport refrigeration system.

19. The controller of claim 16, wherein the operations further comprise:
    directing the refrigeration system into a refrigeration mode when a length of time of the defrost mode exceeds a predetermined defrost length of time.

20. The controller of claim 11, wherein the operations further comprise:
  determining a length of time that the refrigeration system has been in the defrost mode during the detection of the current access condition; and
  directing the refrigeration system into the refrigeration mode if the length of time that the refrigeration system has been in the defrost mode during the detection of the current access condition exceeds a predetermined defrost length of time even though the current access condition is still present.

\* \* \* \* \*